(12) United States Patent
Takehara et al.

(10) Patent No.: US 9,946,275 B2
(45) Date of Patent: Apr. 17, 2018

(54) POWER MANAGEMENT SYSTEM, POWER MANAGEMENT DEVICE, AND LARGE POWER-USING POWER LOAD

(71) Applicant: PANASONIC INTELLECTUAL PROPERTY MANAGEMENT CO., LTD., Osaka (JP)

(72) Inventors: Kiyotaka Takehara, Nara (JP); Kenji Nakakita, Osaka (JP); Hitoshi Nomura, Osaka (JP); Fumitaka Ogasawara, Hyogo (JP); Erina Nagae, Kumamoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 223 days.

(21) Appl. No.: 14/424,434

(22) PCT Filed: Aug. 29, 2013

(86) PCT No.: PCT/JP2013/005098
§ 371 (c)(1),
(2) Date: Feb. 26, 2015

(87) PCT Pub. No.: WO2014/034114
PCT Pub. Date: Mar. 6, 2014

(65) Prior Publication Data
US 2015/0205311 A1   Jul. 23, 2015

(30) Foreign Application Priority Data
Aug. 31, 2012  (JP) ................. 2012-192155

(51) Int. Cl.
*G05F 1/12*   (2006.01)
*H02J 3/46*   (2006.01)
*H02J 3/14*   (2006.01)

(52) U.S. Cl.
CPC ................. *G05F 1/12* (2013.01); *H02J 3/14* (2013.01); *H02J 3/46* (2013.01); *Y02B 70/3225* (2013.01); *Y04S 20/222* (2013.01); *Y10T 307/406* (2015.04)

(58) Field of Classification Search
CPC ............................. Y10T 307/406; G05F 1/12
(Continued)

(56) References Cited

U.S. PATENT DOCUMENTS 6,018,690 A * 1/2000 Saito .................... H02J 3/14
                                                    700/293
6,301,674 B1  10/2001 Saito et al.
(Continued)

FOREIGN PATENT DOCUMENTS

JP   H02-146931 A    6/1990
JP   H03-245730 A   11/1991
(Continued)

OTHER PUBLICATIONS

International Search Report issued in the International Application No. PCT/JP2013/005098 dated Dec. 3, 2013, with English Translation.
(Continued)

*Primary Examiner* — Rexford Barnie
*Assistant Examiner* — Joseph Inge
(74) *Attorney, Agent, or Firm* — McDermott Will & Emery LLP

(57) ABSTRACT

The power management system includes: a power management device for managing power to be used by multiple power loads; and a large power-using power load. The large power-using power load is defined as a power load which shows a power consumption larger than a difference between allowable power and an upper limit power smaller than the allowable power when operating at a maximum power
(Continued)

consumption. The power management device calculates remaining available power available for the large power-using power load, from the total power consumption of the multiple power loads and the upper limit power, and notifies the remaining available power to the large power-using power load. The large power-using power load starts to operate under a condition that its power consumption is equal to or less than the remaining available power notified by the power management device.

20 Claims, 10 Drawing Sheets

(58) Field of Classification Search
USPC .......................................................... 307/31
See application file for complete search history.

(56) References Cited

U.S. PATENT DOCUMENTS 6,528,957 B1 * 3/2003 Luchaco .............. H05B 37/034
307/31

2005/0143865 A1 * 6/2005 Gardner .................... H02J 3/14
700/291
2009/0152942 A1 * 6/2009 Waite ........................ H02J 1/14
307/9.1

FOREIGN PATENT DOCUMENTS

| JP | 10-94199 A | 4/1998 |
|---|---|---|
| JP | 2006-227061 A | 8/2006 |
| JP | 2008-104310 A | 5/2008 |
| JP | 2008-167544 A | 7/2008 |
| JP | 2008-167545 A | 7/2008 |
| JP | 2009-130973 A | 6/2009 |
| JP | 2011-204431 A | 10/2011 |
| JP | 2012-005325 A | 1/2012 |
| JP | 2012-005332 A | 1/2012 |

OTHER PUBLICATIONS

Extended European Search Report dated Oct. 8, 2015 issued in European Patent Application No. 13832863.8.

* cited by examiner

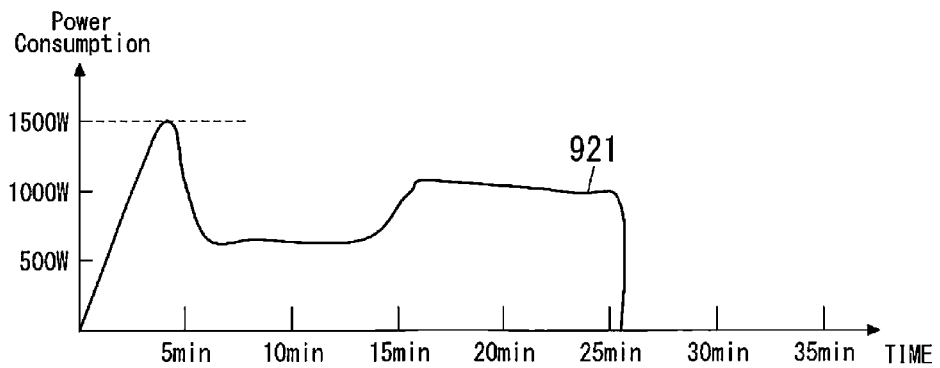
FIG. 10
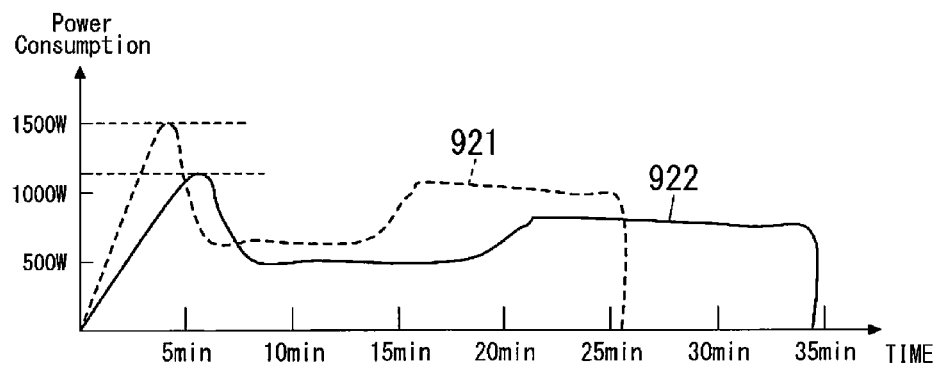
FIG. 11
| Mode | Peak Power Consumption |
|---|---|
| 1 | 500W |
| 2 | 600W |
| ⋮ | ⋮ |
| K | 1500W |
| ⋮ | ⋮ |
| N | 2000W |
FIG. 12

| Mode | Peak Power Consumption | Alternative Mode | Peak Power Consumption |
|---|---|---|---|
| 1 | 500W | None | |
| 2 | 600W | 2 | 500W |
| ⋮ | ⋮ | ⋮ | ⋮ |
| K | 1500W | K | 1200W |
| ⋮ | ⋮ | ⋮ | ⋮ |
| N | 2000W | None | |

913

POWER MANAGEMENT SYSTEM, POWER MANAGEMENT DEVICE, AND LARGE POWER-USING POWER LOAD

RELATED APPLICATIONS

This application is a national phase of International Application No. PCT/JP2013/005098, filed on Aug. 29, 2013, which in turn claims the benefit of Japanese Application No. 2012-192155, filed on Aug. 31, 2012 the disclosures of which Applications are incorporated by reference herein.

TECHNICAL FIELD

The present invention relates to a power management system for managing power to be used by multiple power loads, and a power management device and a large power-using power load to be used in this power management system.

BACKGROUND ART

In the past, there has been known techniques of managing power to be used by multiple power loads. For example, when a total power consumption of multiple power loads exceeds contract power, this fact is notified, and current flows to predetermined power loads and distribution circuits are interrupted (see JP 2009-130973 A (hereinafter referred to as "document 1"), for example).

The power management system disclosed in document 1 is a system for monitoring power consumptions of multiple power loads and controlling the multiple power loads. When detecting an overcurrent through a main breaker, to reduce a power consumption of an electric device with a high rank of controllability or interrupt consumption of power by the electric device, this power management system disclosed in document 1 controls the electric device.

However, the aforementioned prior techniques are techniques for responding to an event where the main breaker trips or an event where the total power consumption of the multiple power loads exceeds contract power or predetermined peak power, in a case where the multiple power loads are allowed to use power freely. In summary, the prior techniques aim to solve a problem occurring when the total power consumption has exceeded the upper limit power. Hence, there is a problem that the total power consumption actually exceeds the upper limit power.

SUMMARY OF INVENTION

In view of the above insufficiency, the present invention has aimed to propose a power management system capable of reducing a probability that power to be used by multiple power load exceeds upper limit power, a power management device and a large power-using power load which are to be used in this power management system.

The power management system of the present invention is characterized by including: a power management device configured to manage power to be used by multiple power loads; and a large power-using power load which is one of the multiple power loads, the large power-using power load being defined as a power load which shows a power consumption larger than a difference between allowable power regarding a total power consumption of the multiple power loads and an upper limit power regarding the total power consumption which is smaller than the allowable power when operating at a maximum power consumption, the power management device including: a setting unit configured to set the upper limit power; an acquiring unit configured to acquire the total power consumption given by a measurement value from a measurement unit configured to measure the total power consumption; a calculating unit configured to calculate remaining available power which is available for the large power-using power load, from the upper limit power set by the setting unit and the total power consumption acquired by the acquiring unit; and a notification unit configured to notify the remaining available power calculated by the calculating unit, to the large power-using power load, and the large power-using power load including: a power-using unit configured to perform a predetermined operation by using power; and an operation controller configured to allow the power-using unit to start to operate under a condition that a power consumption of the power-using unit is equal to or less than the remaining available power notified by the power management device.

In this power management system, it is preferable that the operation controller be configured to, after allowing the power-using unit to start to operate, allow the power-using unit to keep operating under a condition that the power consumption of the power-using unit is equal to or less than total power which is a sum of the remaining available power notified by the power management device and a power consumption of the power-using unit at the time of notification of the remaining available power notified by the power management device.

In this power management system, it is preferable that the calculating unit of the power management device be configured to use a value obtained by subtracting the total power consumption from the upper limit power, as the remaining available power.

In this power management system, it is preferable that the calculating unit of the power management device be configured to use a value obtained by subtracting the total power consumption and a constant value from the upper limit power, as the remaining available power.

In this power management system, it is preferable that the calculating unit of the power management device be configured to calculate the remaining available power when the total power consumption exceeds the upper limit power as a result of use of power by one or some of the multiple power loads other than the large power-using power load while the large power-using power load is in operation.

In this power management system, it is preferable that: the large power-using power load further include a requesting unit configured to send a notification request of the remaining available power to the power management device; and the calculating unit of the power management device be configured to calculate the remaining available power in response to reception of the notification request from the large power-using power load.

In this power management system, it is preferable that the notification unit of the power management device be configured to notify the remaining available power to the large power-using power load in push delivery.

In this power management system, it is preferable that: the large power-using power load further include a load-side storage device configured to store multiple power-using modes individually having multiple time-series power-using properties and multiple maximum power consumptions of the multiple power-using properties which are associated with each other in one-to-one correspondence, and a determination unit configured to compare the remaining available power with the multiple maximum power consumptions associated with the multiple power-using modes to determine whether each of the multiple power-using modes is performable; and the operation controller be configured to execute a power-using mode which is one of the multiple power-using modes determined by the determination unit to be performable.

In this power management system, it is preferable that: the multiple power-using modes include a specific power-using mode; the load-side storage device be configured to store, in association with the specific power-using mode, an alternative mode having a power-using property which is smaller in a maximum power consumption and is longer in performing time than the power-using property of the specific power-using mode; and the operation controller be configured to, when the specific power-using mode is determined by the determination unit not to be performable, perform the alternative mode associated with the specific power-using mode so that a maximum power consumption of the large power-using power load is smaller than the remaining available power.

In this power management system, it is preferable that the operation controller be configured to, when total power defined as a sum of the remaining available power and a power consumption of the power-using unit becomes smaller than the maximum power consumption of the specific power-using mode while the specific power-using mode is performed, switch to the alternative mode associated with the specific power-using mode so that the maximum power consumption of the large power-using power load is smaller than the total power.

In this power management system, it is preferable that the power management system be configured to stop power supply to the multiple power loads when the total power consumption exceeds the value of the allowable power.

The power management device of the present invention is to be used in the power management system.

The large power-using power load of the present invention is to be used in the power management system.

According to the present invention, the power management device notifies the remaining available power to the large power-using power load, and thereafter the large power-using power load operates under a condition that the power consumption of the large power-using power load is equal to or less than the remaining available power. Consequently, it makes possible to reduce a probability that the total power consumption of the multiple power loads exceeds the upper limit power as a result of use of power by the large power-using power load.

BRIEF DESCRIPTION OF THE DRAWINGS

Preferable embodiments of the present invention are described in detail. The other features and advantages of the present invention are well understood with reference to the following detail descriptions and attached drawings.

FIG. 10 is a diagram illustrating the power-using property of the power-using mode of the large power-using power load in accordance with Embodiment 4.

FIG. 11 is a diagram illustrating the correspondence table of the power-using modes and the maximum power consumptions of the large power-using power load in accordance with Embodiment 4.

FIG. 12 is a diagram illustrating the power-using property of the alternative mode of the large power-using power load in accordance with Embodiment 5.

DESCRIPTION OF EMBODIMENTS

In power management systems in accordance with following Embodiments 1 to 5, a power management device calculates, from a total power consumption of multiple power loads including a large power-using power load and an upper limit power defining an upper limit of the total power consumption, remaining available power which is available for the large power-using power load. Further, the power management system notifies the remaining available power to the large power-using power load at appropriate timing. The large power-using power load starts to operate under a condition that a power consumption of the large power-using power load is kept equal to or less than the remaining available power notified by the power management device.

In this regard, the large power-using power load means a power load which causes the total power consumption to go outside an allowable range when the large power-using power load operates at a maximum power consumption under a condition that a power consumption of power loads of the multiple power loads other than the large power-using power load is equal to the upper limit power defining the upper limit of the total power consumption of the multiple power loads. In other words, the large power-using power load is defined as a power load which uses power larger than a difference between allowable power regarding a total power consumption of the multiple power loads and an upper limit power regarding the total power consumption which is smaller than the allowable power when operating at a maximum power consumption.

Hereinafter, Embodiments 1 to 5 are described with reference to the drawings.

(Embodiment 1)

Figure 1:
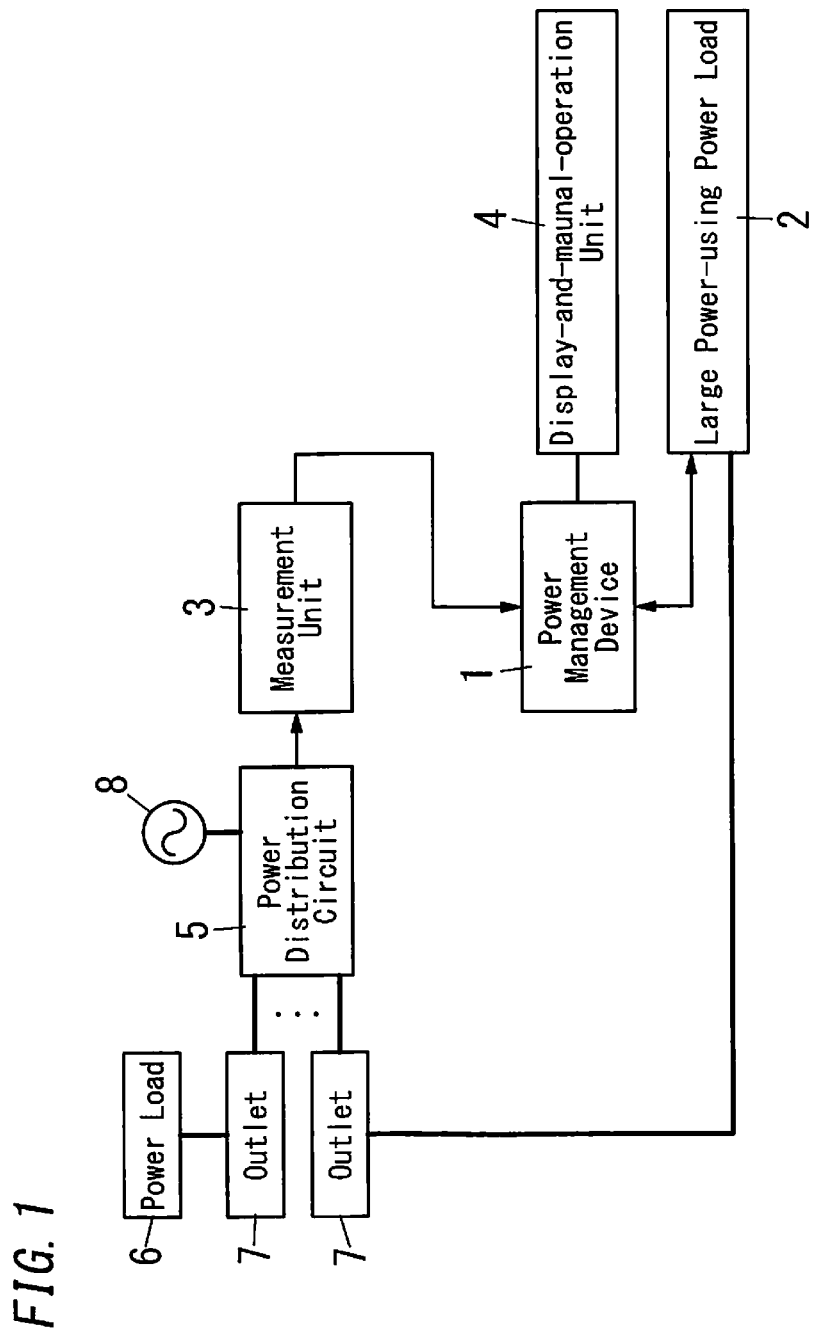
FIG. 1 is a block diagram illustrating the whole configuration of the power management system in accordance with Embodiment 1.

As shown in FIG. 1, the power management system in accordance with Embodiment 1 includes a power control device (energy management controller) 1 configured to manage power used by multiple power loads which exist inside a managed area, and a large power-using power load 2 (hereinafter referred to as "large power load 2") which is one of the multiple power loads. Further, the power management system includes a measurement unit 3 configured to measure the total power consumption of the multiple power loads, and a display-and-manual-operation unit 4 configured to display various types of information. Note that, in FIG. 1, power cables are illustrated by bold lines, and this is applied to other drawings.

The power management system of the present embodiment is installed in a general single-family home (managed area), and is used in a power supply system which supplies power to the multiple power loads by use of a commercial power supply 8. This power supply system includes a power distribution circuit 5 configured to distribute power to the multiple power loads. The multiple power loads include the large power load 2 and at least one power load 6 different from the large power load 2. Note that, in the example shown in FIG. 1, the large power load 2 and the power load 6 are connected to different outlets 7 and thus receive power. However, the large power load 2 and the power load 6 may be connected to the power distribution circuit 5 directly. Note that, the power load 6 may be constituted by two or more power loads of the multiple power loads other than the large power load 2.

The following description relates to a case where the power management system is installed in the general single-family home. However, the power management system need not be necessarily used in such a single-family home, but may be used in a dwelling unit of a condominium, a facility, a factory, an office, or a store, for example.

The large power-using power load 2 is defined as a power load which causes the total power consumption of the multiple power loads (the large power load 2, the power load 6) to go outside the allowable range when the large power load 2 operates at the maximum power consumption while a power consumption of the power load 6 other than the large power load 2 is equal to the upper limit power. The total power consumption of the multiple power loads is defined as a sum of a power consumption of the large power load 2 and a power consumption of the power load 6. The upper limit power is defined as the upper limit of the total power consumption of the multiple power loads. The upper limit power is, for example, contract power. The allowable range is defined as a range of power which is equal to or more than minimum power smaller than the upper limit power and is equal to or less than maximum power (allowable power) greater than the upper limit power. The minimum power of the allowable range may be zero. The maximum power of the allowable range may be smaller than the allowable power and may mean power which causes a circuit breaker installed in the power distribution circuit 5 to switch to an interrupting state, for example. The large power load 2 is a load having the maximum power consumption larger than the difference between the maximum power of the allowable range and the upper limit power. In other words, the large power-using power load 2 shows a power consumption which exceeds the difference between the allowable power and the upper limit power when the large power-using power load 2 operates at the maximum power consumption.

In contrast, the power load 6 means a load which has a maximum power consumption smaller than the difference between the maximum power of the allowable range and the upper limit power. In other words, the maximum power consumption of the power load 6 is smaller than the maximum power consumption of the large power load 2.

The large power-using power load 2 is also defined as a power load which causes the total power consumption of the multiple power loads to extremely exceed the allowable power and the circuit breaker to operate in a short time, when the large power load 2 operates at the maximum power consumption while the power consumption of the power load 6 is close to the upper limit power of the single-family home such as a maximum capacity of the power distribution circuit 5, for example. Thus, when the total power consumption exceeds the allowable power, power supply to the multiple power loads is interrupted. For example, in a case of a home with the upper limit power of 10 kW, when the total power consumption exceeds 14 kW (the maximum power of the allowable range), the circuit breaker switches to the interrupting state in a few seconds. In this case, the large power load 2 is defined as a power load having the maximum power consumption of 4 kW. The large power load 2 may include equipment for charging electric vehicles, storage batteries, IH (Induction Heating) cooking heaters, and air conditioners.

Figure 5:
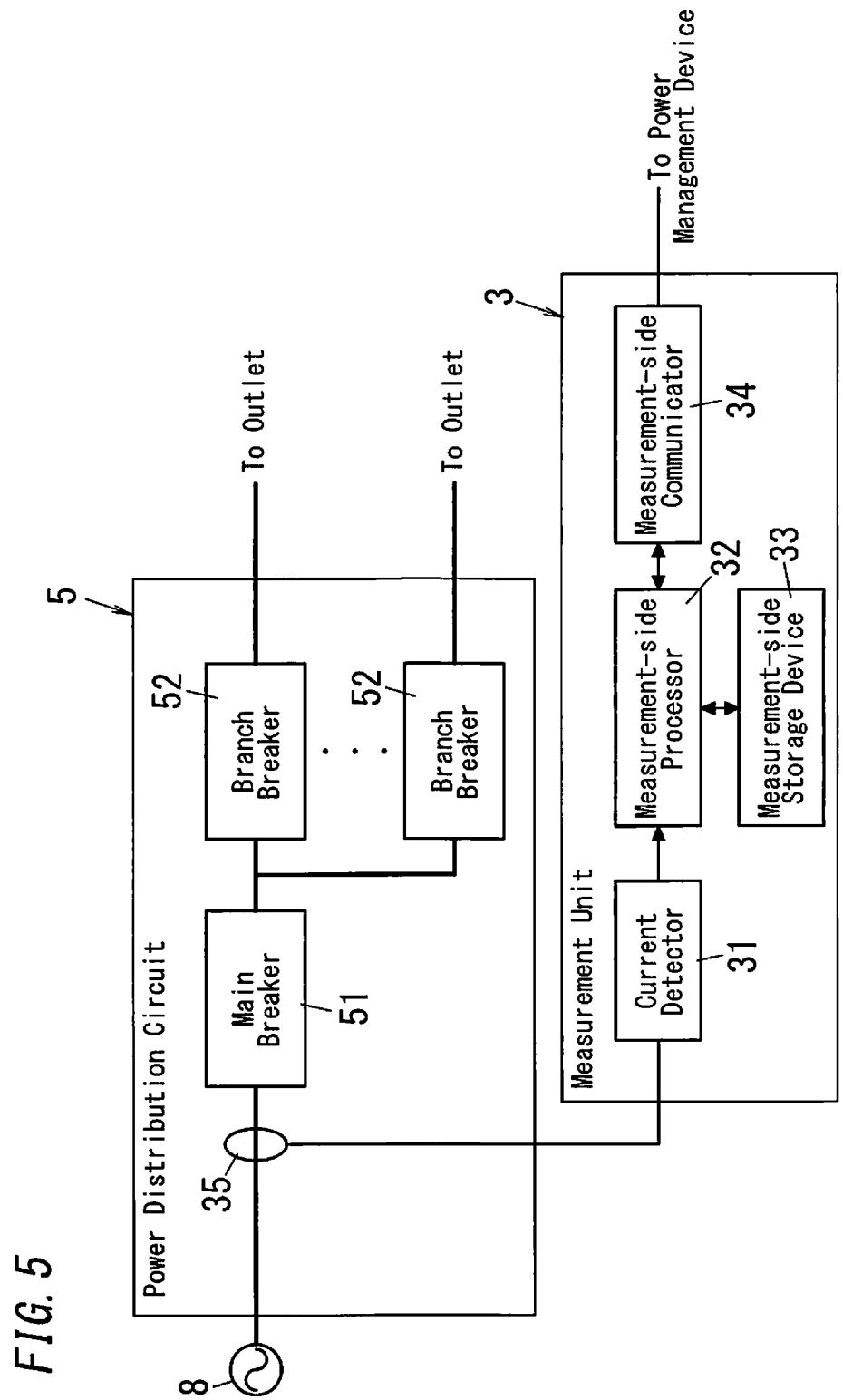
FIG. 5 is a block diagram illustrating the configurations of the measurement unit and the power distribution circuit in accordance with Embodiment 1.

The power distribution circuit 5 distributes AC power to the large power load 2 and the power load 6. As shown in FIG. 5, this power distribution circuit 5 includes a main breaker 51 and multiple (two, in the illustrated example) branch breakers 52. The main breaker 51 outputs AC power from the commercial power supply 8 to each of the branch breakers 52. The branch breaker 52 supplies power from the main breaker 51 to power loads (the large power load 2, the power load 6) connected to the outlets 7.

The measurement unit 3 includes a current detector 31, a measurement-side processor 32, a measurement-side storage device 33, and a measurement-side communicator 34.

The current detector 31 uses a current transformer 35 to detect a current flowing through a main circuit connected to an input side of the main breaker 51.

The measurement-side processor 32 is mainly constituted by a CPU (Central Processing Unit), and has a function of calculating power through the main circuit from a current detected by the current detector 31, that is, the total power consumption.

The measurement-side storage device 33 stores a detection result obtained by detection of the current detector 31 and the total power consumption calculated by the measurement-side processor 32.

The measurement-side communicator 34 has a function of communicating with the power management device 1 (see FIG. 1). The measurement-side communicator 34 sends power consumption information indicating the total power consumption to the power management device 1 in accordance with instructions from the measurement-side processor 32.

Figure 6:
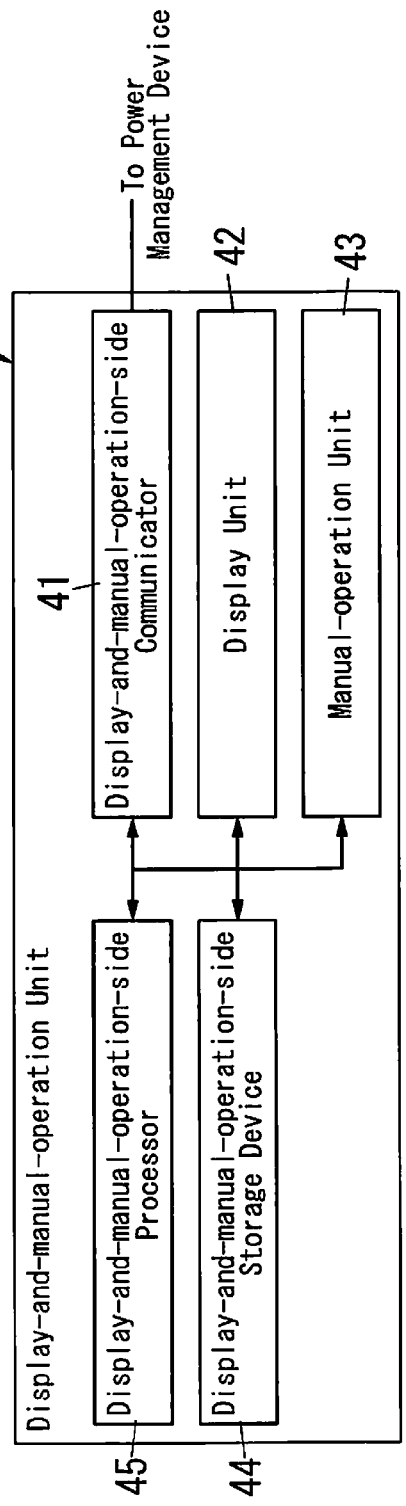
FIG. 6 is a block diagram illustrating the configuration of the displaying and manual-operating unit in accordance with Embodiment 1.

As shown in FIG. 6, the display-and-manual-operation unit 4 includes a display-and-manual-operation communicator 41, a display unit 42, a manual-operation unit 43, a display-and-manual-operation storage device 44, and a display-and-manual-operation processor 45.

The display-and-manual-operation-side communicator 41 has a function of communicating with the power management device 1 (see FIG. 1). The display-and-manual-operation-side communicator 41 sends a setting value of the upper limit power to the power management device 1.

Figure 7:
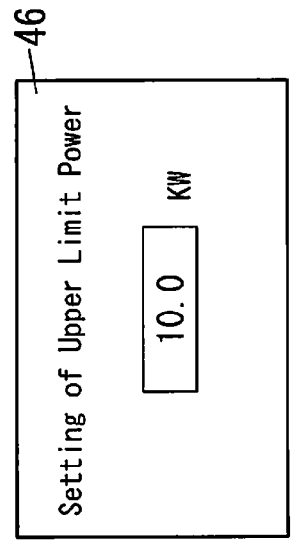
FIG. 7 is a diagram illustrating the screen of the displaying and manual-operating unit in accordance with Embodiment 1.

The display unit 42 is a liquid crystal display (LCD) or an organic EL (Electro Luminescence) display, for example. The display unit 42 displays information from the power management device 1 and information stored in the display-and-manual-operation storage device 44. For example, as shown in FIG. 7, the display unit 42 displays a setting screen 46 for the upper limit power.

The manual-operation unit 43 may be a set of plural manual-operation buttons or a touch panel, for example. The manual-operation unit 43 receives various types of information and instructions in response to input operation by a user. For example, in response to input operation by a user, the upper limit power is inputted into the manual-operation unit 43. The upper limit power inputted into the manual-operation unit 43 is stored in the display-and-manual-operation storage device 44 or is sent by the display-and-manual-operation-side communicator 41 to the power management device 1.

The display-and-manual-operation storage device 44 stores the upper limit power inputted by the manual operation on the manual-operation unit 43.

The display-and-manual-operation processor 45 controls the display-and-manual-operation-side communicator 41 so as to send the setting value of the upper limit power to the power management device 1.

Figure 2:
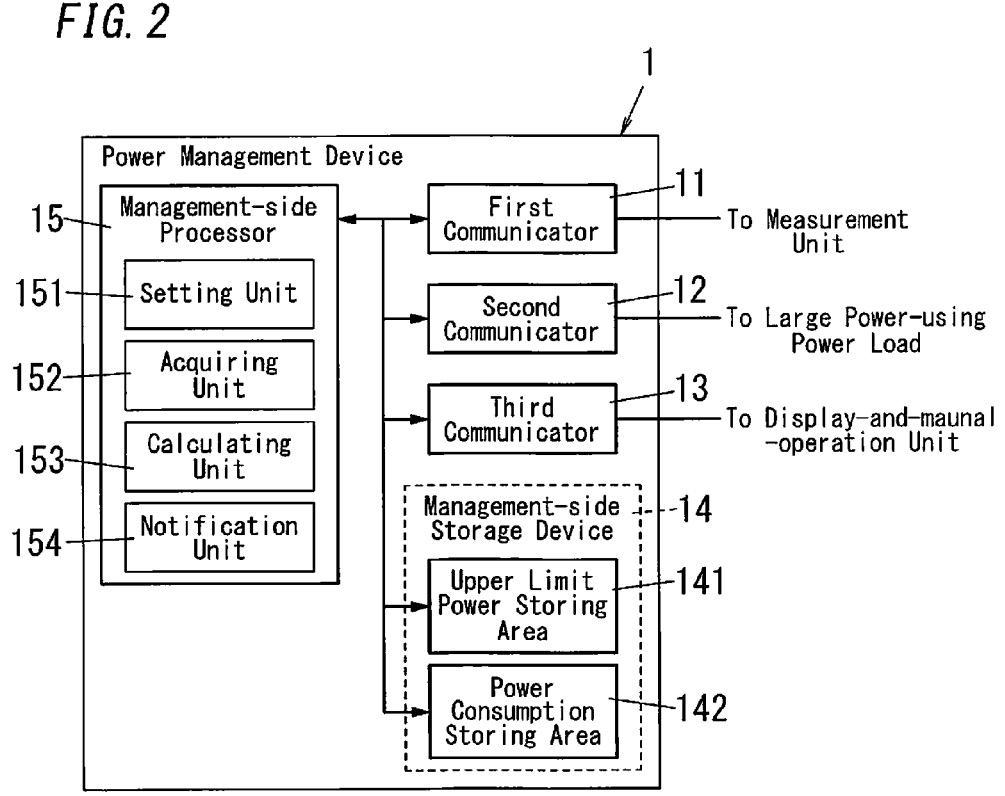
FIG. 2 is a block diagram illustrating the configuration of the power management device in accordance with Embodiment 1.

The power management device 1 is mainly constituted by a computer (including a microcomputer) including a CPU and a memory. As shown in FIG. 2, the power management device 1 includes a first communicator 11, a second communicator 12, a third communicator 13, a management-side storage device 14, and a management-side processor 15.

The first communicator 11 has a function of communicating with the measurement unit 3 (see FIG. 1). The first communicator 11 receives information indicative of the total power consumption from the measurement unit 3.

The second communicator 12 has a function of communicating with the large power load 2 (see FIG. 1). The second communicator 12 sends information indicative of the remaining available power to the large power load 2.

The third communicator 13 has a function of communicating with the display-and-manual-operation unit 4. The third communicator 13 receives information indicative of the upper limit power from the display-and-manual-operation unit 4.

The management-side storage device 14 is constituted by one or some of various types of memories, and stores various types of information. The management-side storage device 14 includes an upper limit power storing area 141 and a power consumption storing area 142. The upper limit power storing area 141 stores the information indicative of the upper limit power. The power consumption storing area 142 stores the information indicative of the total power consumption. Note that, the management-side storage device 14 also stores various types of information other than the aforementioned information.

Further, the management-side storage device 14 stores programs for enabling the power management device 1, which is a computer, to perform various types of functions.

The management-side processor 15 is mainly constituted by a CPU provided to a computer, and operates in accordance with the programs stored in the management-side storage device 14 to realize the functions of a setting unit 151, an acquiring unit 152, a calculating unit 153, and a notification unit 154.

The setting unit 151 uses the third communicator 13 to acquire the setting value from the display-and-manual-operation unit 4 (see FIG. 1), and sets the upper limit power defining the upper limit of the total power consumption of the multiple power loads. Thereafter, the setting unit 151 stores the set upper limit power in the upper limit power storing area 141 of the management-side storage device 14. Note that, the upper limit power need not necessarily be equal to the setting value inputted into the display-and-manual-operation unit 4, and may be equal to demand limit power (contract power) of a power supplier such as a power company. Alternatively, the upper limit power may be equal to the maximum capacity of the power distribution circuit 5.

The acquiring unit 152 uses the first communicator 11 to periodically acquire the total power consumption of the multiple power loads from the measurement unit 3 (see FIG. 1). Further, the acquiring unit 152 stores the acquired total power consumption in the power consumption storing area 142 of the management-side storage device 14.

The calculating unit 153 calculates the remaining available power from the upper limit power set by the setting unit 151 and the total power consumption acquired by the acquiring unit 152. The remaining available power is defined as power available for the large power load 2 (see FIG. 1). The calculating unit 153 of the present embodiment periodically performs calculation of subtracting the total power consumption acquired by the acquiring unit 152 from the upper limit power set by the setting unit 151, and determines a value obtained by subtracting the total power consumption from the upper limit power (upper limit power minus total power consumption) as the remaining available power. When the total power consumption is not larger than the upper limit power, the remaining available power is a positive value. When the total power consumption is larger than the upper limit power, the remaining available power is a negative value. When the remaining available power is a positive value, if the large power load 2 does not yet start to operate, the large power load 2 can start to operate under a condition that the power consumption of the large power load 2 is kept equal to or less than the remaining available power. Further, when the large power load 2 is in operation, the large power load 2 can use power more than the current power. In contrast, when the remaining available power is a negative value, the large power load 2 needs to reduce its power consumption to be smaller than the current power consumption.

The notification unit 154 uses the second communicator 12 to notify the remaining available power calculated by the calculating unit 153 to the large power load 2. In other words, even if not receiving a notification request from the large power load 2, the notification unit 154 notifies the remaining available power to the large power load 2 in so-called push delivery. The notification unit 154 may notify the remaining available power to the large power load 2 periodically. The notification unit 154 may notify the remaining available power to the large power load 2 when the total power consumption exceeds the upper limit power as a result of use of power by the power load 6 other than the large power load 2. The notification unit 154 may notify the remaining available power to the large power load 2 when the current remaining available power becomes smaller than the previous remaining available power.

Figure 3:
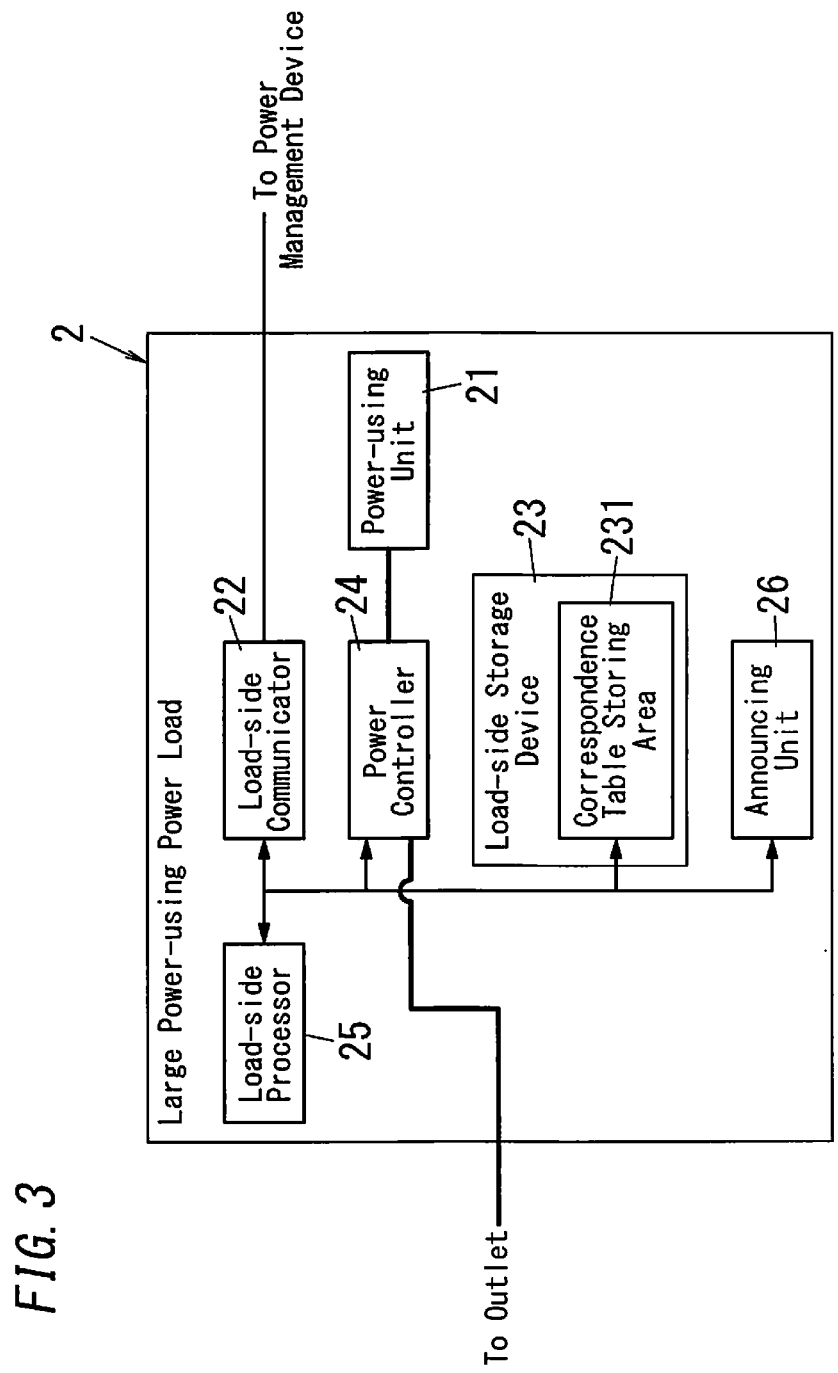
FIG. 3 is a block diagram illustrating the configuration of the large power-using power load in accordance with Embodiment 1.

As shown in FIG. 3, the large power-using power load 2 includes a power-using unit 21, a load-side communicator 22, a load-side storage device 23, a power controller 24, a load-side processor 25, and an announcing unit 26.

The large power load 2 has multiple power-using modes. For example, when the large power load 2 is a storage battery, the power-using modes may include a normal charging mode and a rapid charging mode which is larger in the maximum power consumption and is shorter in charging time than the normal charging mode, for example. Other examples of the power-using modes may include a fully charging mode (100% charging mode), an 80% charging mode, and a 50% charging mode. The fully charging mode, the 80% charging mode, and the 50% charging mode are different from each other in at least one of the maximum power consumption and the charging time.

The power-using unit 21 is a functional unit serving as a load. The power-using unit 21 starts to operate when receiving power. In other words, the power-using unit 21 performs a predetermined operation by using power. The power controller 24 controls supply power to the power-using unit 21 in accordance with instructions from the load-side processor 25.

The load-side communicator 22 has a function of communicating with the power management device 1 (see FIG. 1). The load-side communicator 22 receives the information indicative of the remaining available power from the power management device 1. Note that, communication between the load-side communicator 22 and the second communicator 12 of the power management device 1 (see FIG. 2) may be wireless communication or wired communication.

Figure 4:
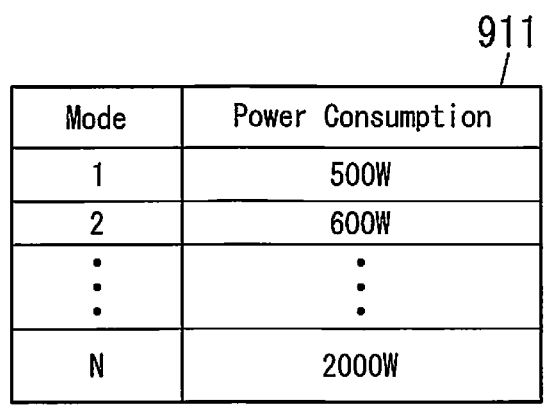
FIG. 4 is a diagram illustrating the correspondence table of the power-using modes and the power consumptions of the large power-using power load in accordance with Embodiment 1.

The load-side storage device 23 includes a correspondence table storing area 231 for storing a correspondence table 911 as shown in FIG. 4. In the correspondence table 911, each power-using mode is associated with a power consumption. In the example shown in FIG. 4, a first mode is associated with a power consumption of 500 W, and a second mode is associated with a power consumption of 600 W, and an N-th mode is associated with a power consumption of 2000 W.

The load-side processor 25 shown in FIG. 3 functions as the operation controller configured to allow the power-using unit 21 to operate under a condition that a power consumption of the power-using unit 21 is equal to or less than the remaining available power notified by the power management device 1. In other words, the load-side processor 25 allows the power-using unit 21 to start to operate under a condition that the power consumption of the power-using unit 21 is equal to or less than the remaining available power notified by the power management device 1. Before starting to use power by the power-using unit 21, the load-side processor 25 refers to the correspondence table 911 of the load-side storage device 23 and selects the power-using mode associated with the power consumption smaller than the remaining available power notified by the power management device 1. Further, each time changing the power consumption of the power-using unit 21, the load-side processor 25 refers to the correspondence table 911 of the load-side storage device 23 and selects the power-using mode associated with the power consumption smaller than total power. The total power is defined as a sum of the remaining available power notified by the power management device 1 and the power consumption of the power-using unit 21 at the time of such notification. The load-side processor 25 allows the power-using unit 21 to operate in accordance with the selected power-using mode. In other words, after allowing the power-using unit 21 to start to operate, the load-side processor 25 allows the power-using unit 21 to keep operating under a condition that the power consumption of the power-using unit 21 is equal to or less than the sum of the remaining available power notified by the power management device 1 and the power consumption of the power-using unit 21 at the time of the notification.

Further, when the total power consumption exceeds the upper limit power as a result of operation of the power load 6 while the power-using unit 21 is in operation, the load-side processor 25 reduces power used by the power-using unit 21 so that the power consumption of the large power load 2 is kept equal to or smaller than the total power. In this case, the remaining available power notified by the power management device 1 is a negative value, and therefore the load-side processor 25 selects the power-using mode capable of decreasing the power consumption by an absolute value of the remaining available power or more relative to the current power consumption. Thereafter, the load-side processor 25 operates the power-using unit 21 in accordance with the selected power-using mode.

Note that, when the large power load 2 cannot use desired power, the load-side processor 25 may control the announcing unit 26 in order to announce this fact. In this case, if a user performs manual-operation such as interrupting power supply to the power load 6 other than the large power load 2, the large power load 2 can use desired power.

Further, when the total power consumption exceeds the upper limit power while the power-using unit 21 is in operation, the load-side processor 25 may interrupt power supply to the large power load 2 in order to avoid a situation in which the total power consumption is larger than the upper limit power.

Figure 8:
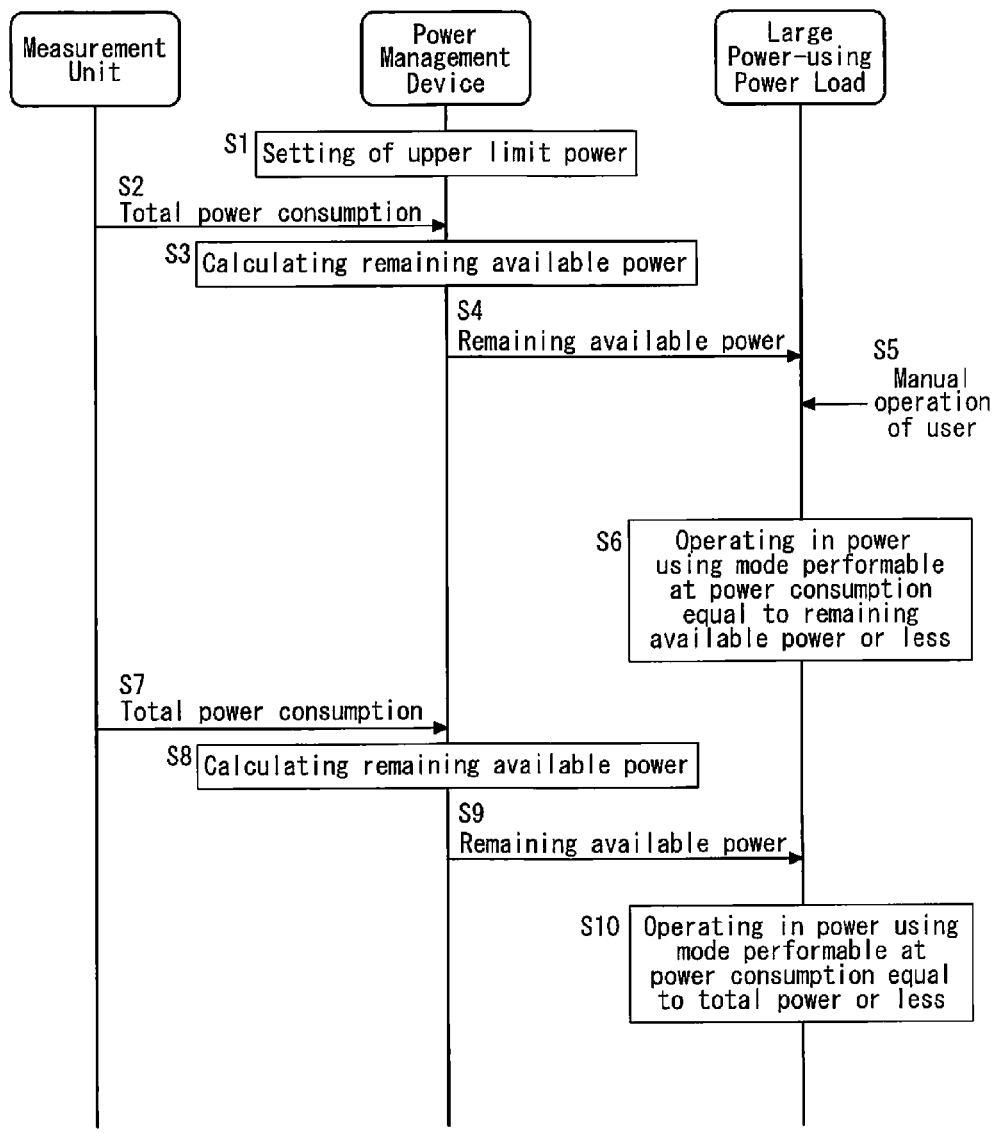
FIG. 8 is an explanatory diagram illustrating the operation of the power management system in accordance with Embodiment 1.

Next, operations of the power management system in accordance with the present embodiment are described with reference to FIG. 8. First, the power management device 1 sets the upper limit power (S1). Then, the power management device 1 acquires the total power consumption of the multiple power loads from the measurement unit 3 (S2). The power management device 1 calculates the remaining available power from the upper limit power set in the step S1 and the total power consumption acquired in the step S2 (S3). After that, the power management device 1 notifies the remaining available power calculated in the step S3 to the large power load 2 (S4). Subsequently, in response to user's manual-operation for allowing the large power load 2 to start to use power (S5), the large power load 2 operates in the power-using mode allowing the large power load 2 to operate under a condition that the power consumption of the large power load 2 is equal to or less than the remaining available power notified by the power management device 1 in the step S4 (S6). The power management device 1 acquires the total power consumption from the measurement unit 3 periodically (S7).

Thereafter, the power management device 1 calculates the remaining available power from the upper limit power set in the step S1 and the total power consumption acquired in the step S7 (S8). When the power consumption of the power load 6 varies and thus the total power consumption exceeds the upper limit power, the remaining available power calculated in the step S8 becomes a negative value, and becomes smaller than the remaining available power (positive value) calculated in the step S3. Subsequently, the power management device 1 notifies the remaining available power calculated in the step S8 to the large power load 2 (S9). The large power load 2 operates in the power-using mode allowing the large power load 2 to operate under a condition that the power consumption of the large power load 2 is equal to or less than the total power in the step S9 (S10). The total power in the step S10 is the sum of the remaining available power notified by the power management device 1 in the step S9 and the power consumption of the power-using unit 21 at the time of such notification.

As described above, the power management system of the present embodiment includes: the power management device 1 configured to manage power to be used by the multiple power loads; and the large power-using power load 2 which is one of the multiple power loads. The large power-using power load 2 is defined as a power load which shows a power consumption larger than a difference between the allowable power regarding the total power consumption of the multiple power loads and the upper limit power regarding the total power consumption which is smaller than the allowable power when operating at the maximum power consumption. The power management device 1 includes the setting unit 151, the acquiring unit 152, the calculating unit 153, and the notification unit 154. The setting unit 151 is configured to set the upper limit power. The acquiring unit 152 is configured to acquire the total power consumption given by a measurement value from the measurement unit 3 configured to measure the total power consumption. The calculating unit 153 is configured to calculate remaining available power which is available for the large power-using power load 2, from the upper limit power set by the setting unit 151 and the total power consumption acquired by the acquiring unit 152. The notification unit 154 is configured to notify the remaining available power calculated by the calculating unit 153, to the large power-using power load 2. The large power-using power load 2 includes the power-using unit 21 and the operation controller (the load-side processor 25). The power-using unit 21 is configured to perform a predetermined operation by using power. The operation controller is configured to allow the power-using unit 21 to start to operate under a condition that a power consumption of the power-using unit 21 is equal to or less than the remaining available power notified by the power management device 1.

According to the power management system of the present embodiment, the power management device 1 notifies the remaining available power to the large power-using power load 2, and thereafter the large power-using power load 2 operates under a condition that the power consumption of the large power-using power load 2 is equal to or less than the above remaining available power. Therefore, it makes possible to suppress use of power by the large power-using power load 2 from causing the total power consumption of the multiple power loads to exceed the upper limit power. As a result, it is possible to reduce a probability that the total power consumption exceeds desired power, a probability that the total power consumption exceeds contract power, and a probability that the total power consumption exceeds the maximum capacity of the power distribution circuit 5 and thus the main breaker 51 interrupts a current flow.

Further, as with the power management system of the present embodiment, it is preferable that the operation controller (the load-side processor 25) be configured to, after allowing the power-using unit 21 to start to operate, allow the power-using unit 21 to keep operating under a condition that the power consumption of the power-using unit 21 is equal to or less than the total power which is the sum of the remaining available power notified by the power management device 1 and the power consumption of the power-using unit 21 at the time of notification of the remaining available power notified by the power management device 1.

As with the power management system of the present embodiment, it is preferable that the calculating unit 153 of the power management device 1 be configured to calculate the remaining available power when the total power consumption exceeds the upper limit power as a result of use of power by one or some of the multiple power loads 6 other than the large power-using power load 2 while the large power-using power load 2 is in operation.

According to the power management system of the present embodiment, even when the total power consumption exceeds the upper limit power as a result of use of power by one or some of the multiple power loads 6 other than the large power-using power load 2 while the large power-using power load 2 is in operation, it makes possible to minimize a period in which the total power consumption is larger than the upper limit power.

As with the power management system of the present embodiment, it is preferable that the calculating unit 153 of the power management device 1 be configured to use a value obtained by subtracting the total power consumption from the upper limit power, as the remaining available power.

As with the power management system of the present embodiment, it is preferable that the notification unit 154 of the power management device 1 be configured to notify the remaining available power to the large power-using power load 2 in push delivery.

As with the power management system of the present embodiment, it is preferable that when the total power consumption exceeds the allowable power, power supply to the multiple power loads be interrupted.

The power management device 1 of the present embodiment is used in the above power management system.

The large power-using power load 2 of the present embodiment is used in the above power management system.

(Embodiment 2)

The power management system of Embodiment 2 is different from the power management system of Embodiment 1 in that the power management device 1 notifies remaining available power including constant extra power, to the large power-using power load 2. In more detail, in the present embodiment, the remaining available power is not defined as a value obtained by subtracting the total power consumption from the upper limit power, but is defined as a value obtained by subtracting the total power consumption and a constant value from the upper limit power (upper limit power−(total power consumption+constant value)). Note that, the same components as the power management system of Embodiment 1 are designated by the same reference signs as the power management system of Embodiment 1, and explanations thereof are omitted.

The calculating unit 153 of the power management device 1 of the present embodiment calculates a value obtained by subtracting the total power consumption and the constant value from the upper limit power, as the remaining available power. Further, even if the total power consumption exceeds the upper limit power as a result of use of power by one or more of the power loads 6 other than the large power load 2 while the large power load 2 is in operation (upper limit power<total power consumption), the calculating unit 153 of the present embodiment calculates the value obtained by subtracting the total power consumption and the constant value from the upper limit power, as the remaining available power. Note that, explanations about the same functions as the calculating unit 153 of Embodiment 1 are omitted.

The constant value in the present embodiment may be a fixed value such as 1 kW, or may be a value given by a fixed proportion of the constant value to the upper limit power such as 10% of the upper limit power.

Note that, the operations of the power management system in accordance with the present embodiment are the same as the operations of the previous embodiment except the calculation of the remaining available power by the calculation unit 153 and explanations thereof are omitted.

As with the power management system of the present embodiment described above, it is preferable that the calculating unit 153 of the power management device 1 be configured to use a value obtained by subtracting the total power consumption and a constant value from the upper limit power, as the remaining available power.

In the power management system of the present embodiment, the power management device 1 notifies the remaining available power including constant extra power, to the large power-using power load 2. Consequently, even if a measurement error is caused by a fluctuation of instantaneous power, the power management system of the present embodiment can prevent the total power consumption of the multiple power loads from exceeding the upper limit power when the large power-using power load 2 starts to operate.

Further, also in a case where the large power-using power load 2 operates under a condition that the power consumption of the large power-using power load 2 is kept equal to or less than the remaining available power, the power management system of the present embodiment can prevent continuation of a situation where the total power consumption of the multiple power loads is larger than the upper limit power due to a measurement error or the like.

(Embodiment 3)

The power management system in accordance with Embodiment 3 is different from the power management system in accordance with Embodiment 1 in that the power management device 1 notifies the remaining available power to the large power load 2 when the power management device 1 receives a notification request of the remaining available power from the large power-using power load 2. In other words, the power management device 1 of the present embodiment does not notify the remaining available power to the large power load 2 periodically, but notifies the remaining available power to the large power load 2 in response to an inquiry from the large power load 2 to the power management device 1. Note that, the same components as the power management system of Embodiment 1 are designated by the same reference signs as the power management system of Embodiment 1, and explanations thereof are omitted.

The load-side processor 25 of the large power load 2 of the present embodiment functions as a requesting unit configured to send the notification request of the remaining available power to the power management device 1. The load-side processor 25 of the present embodiment sends the notification request to the power management device 1 before starting use of power by the power-using unit 21 or before changing the power consumption of the power-using unit 21. Note that, explanations about the same functions as the load-side processor 25 of Embodiment 1 are omitted.

When receiving the notification request from the large power load 2, the acquiring unit 152 of the power management device 1 of the present embodiment uses the first communicator 11 to send an inquiry regarding the total power consumption to the measurement unit 3, and thereby acquires the total power consumption from the measurement unit 3. Note that, explanations about the same functions as the acquiring unit 152 of Embodiment 1 are omitted.

When receiving the notification request from the large power load 2, the calculating unit 153 of the power management device 1 of the present embodiment calculates the remaining available power. After receiving the notification request from the large power load 2 once, the calculating unit 153 calculates the remaining available power periodically. The notification unit 154 notifies the remaining available power calculated by the calculating unit 153 to the large power load 2. Note that, explanations about the same functions as the calculating unit 153 of Embodiment 1 are omitted.

Figure 9:
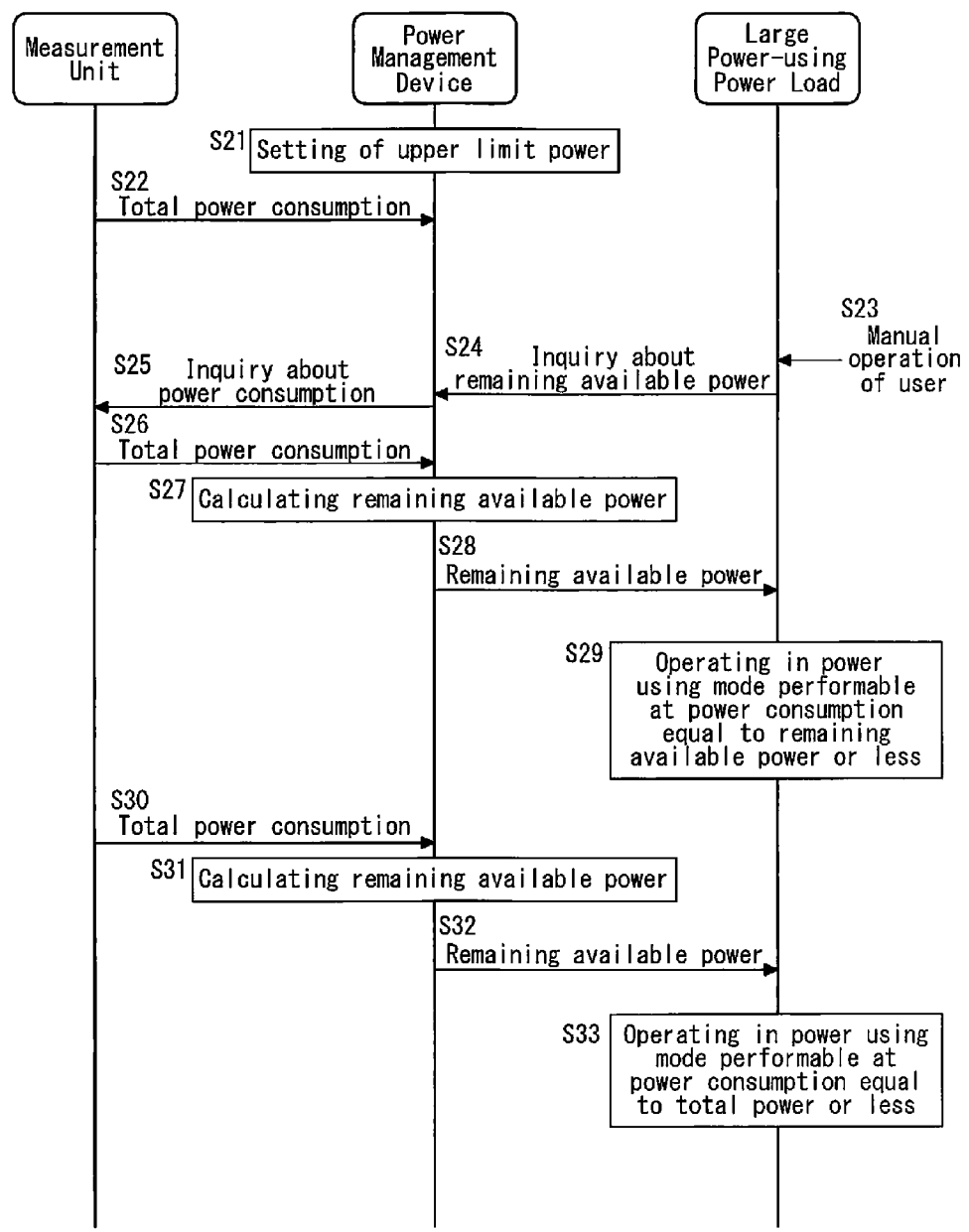
FIG. 9 is an explanatory diagram illustrating the operation of the power management system in accordance with Embodiment 3.

Next, operations of the power management system in accordance with the present embodiment are described with reference to FIG. 9. First, the power management device 1 sets the upper limit power (S21). Then, the power management device 1 acquires the total power consumption of the multiple power loads from the measurement unit 3 (S22). When a user performs manual operation regarding the large power load 2 (S23), the large power load 2 sends an inquiry about the remaining available power to the power management device 1 (S24). The power management device 1 sends an inquiry about the total power consumption to the measurement unit 3 (S25). The measurement unit 3 outputs information indicative of the total power consumption to the power management device 1 (S26). The power management device 1 calculates the remaining available power from the upper limit power set in the step S21 and the total power consumption acquired in the step S26 (S27). After that, the power management device 1 notifies the remaining available power calculated in the step S27 to the large power load 2 (S28). The large power load 2 operates in the power-using mode allowing the large power load 2 to operate under a condition that the power consumption of the large power load 2 is equal to or less than the remaining available power notified by the power management device 1 (S29). The power management device 1 acquires the total power consumption from the measurement unit 3 periodically (S30).

Thereafter, the power management device 1 calculates the remaining available power from the upper limit power set in the step S21 and the total power consumption acquired in the step S30 (S31). When the power consumption of the power load 6 varies and thus the total power consumption exceeds the upper limit power, the remaining available power calculated in the step S31 becomes smaller than the remaining available power calculated in the step S27. Subsequently, the power management device 1 notifies the remaining available power calculated in the step S31 to the large power load 2 (S32). The large power load 2 operates in the power-using mode allowing the large power load 2 to operate under a condition that the power consumption of the large power load 2 is equal to or less than the total power (S33). The total power in the step S33 is the sum of the remaining available power notified by the power management device 1 in the step S32 and the power consumption of the power-using unit 21 at the time of such notification.

As with the power management system of the present embodiment described above, it is preferable that the large power-using power load 2 further include the requesting unit (the load-side processor 25). The requesting unit is configured to send the notification request of the remaining available power to the power management device 1. In this case, the calculating unit 153 of the power management device 1 is configured to calculate the remaining available power in response to reception of the notification request from the large power-using power load 2.

In the power management system of the present embodiment, the large power-using power load 2 sends the notification request of the remaining available power to the power management device 1 immediately before starting to operate, and therefore the power management device 1 can calculate the remaining available power based on the latest power consumption. Consequently, the power management system of the present embodiment can notify the highly reliable remaining available power to the large power-using power load 2 from the power management device 1, and therefore it makes possible to further reduce a probability that the total power consumption exceeds the upper limit power when the large power-using power load 2 starts to operate.

(Embodiment 4)

The power management system in accordance with Embodiment 4 is different from the power management system in accordance with Embodiment 1 in that the large power-using power load 2 determines, based on the maximum power consumption of the power-using property (power-using profile) of the power-using mode, whether the power-using mode is performable. Note that, the same components as the power management system of Embodiment 1 are designated by the same reference signs as the power management system of Embodiment 1, and explanations thereof are omitted.

The load-side storage device 23 of the large power load 2 of the present embodiment stores a power-using property such as a power-using property 921 shown in FIG. 10 for each of the power-using modes. Note that, explanations about the same functions as the load-side storage device 23 of Embodiment 1 are omitted.

The power-using property 921 is defined as a property defining a time variation of a power consumption from the time of start of performing the power-using mode, as shown in FIG. 10. In the power-using property 921 of FIG. 10, the maximum power consumption is 1500 W.

Further, the load-side storage device 23 of the present embodiment stores a correspondence table 912 as shown in FIG. 11. In the correspondence table 912, the power-using modes are individually associated with peak power consumptions (maximum power consumptions) of the power-using properties 921. In the example of FIG. 11, the first mode is associated with a peak power consumption of 500 W, and the second mode is associated with a peak power consumption of 600 W, and the K-th mode is associated with a peak power consumption of 1500 W, and the N-th mode is associated with a peak power consumption of 2000 W.

The load-side processor 25 of the large power load 2 of the present embodiment functions as a determination unit configured to compare the remaining available power with the multiple maximum power consumptions of the power-using properties 921 associated with the multiple power-using modes to determine whether each of the multiple power-using modes is performable. The load-side processor 25 is configured to execute a power-using mode which is one of the multiple power-using modes determined to be performable. Note that, explanations about the same functions as the load-side processor 25 of Embodiment 1 are omitted.

As with the power management system of the present embodiment described above, it is preferable that the large power-using power load 2 further include the load-side storage device 23 and the determination unit (the load-side processor 25). The load-side storage device 23 is configured to store multiple power-using modes individually having multiple time-series power-using properties and multiple maximum power consumptions of the multiple power-using properties which are associated with each other in one-to-one correspondence. The determination unit is configured to compare the remaining available power with the multiple maximum power consumptions associated with the multiple power-using modes to determine whether each of the multiple power-using modes is performable. The operation controller (the load-side processor 25) is configured to execute a power-using mode which is one of the multiple power-using modes determined by the determination unit to be performable.

The power management system of the present embodiment can deal with a power load whose power consumption varies with time. For example, in cooking rice, the power consumption (i.e., heating power) is reduced at the time of starting the power-using mode, and the heating power is increased after a lapse of predetermined time from the time of start of performing the power-using mode. This is a general food preparation method, and the power management system can deal with the power-using mode corresponding to such a food preparation method. Alternatively, in a case where the large power-using power load 2 is a storage battery, it is possible to use the normal charging mode and the rapid charging mode in different ways, or use the fully charging mode, the 80% charging mode, and the 50% charging mode in different ways, in accordance with the magnitude of the remaining available power.

Note that, the load-side storage device 23 of the large power-using power load 2 need not necessarily store the power-using properties of all of the multiple power-using modes, and may be store only the power-using property of at least one of the multiple power-using modes.

Determining whether the power-using mode is performable based on the maximum power consumption of the power-using property of the power-using mode as with the present embodiment may be applicable to any of the power management systems of Embodiments 2 and 3.

(Embodiment 5)

The power management system in accordance with Embodiment 5 is different from the power management system in accordance with Embodiment 1 in that the large power-using power load 2 includes at least one alternative mode in addition to the power-using modes. Note that, the same components as the power management system of Embodiment 1 are designated by the same reference signs as the power management system of Embodiment 1, and explanations thereof are omitted.

The load-side storage device 23 of the large power load 2 of the present embodiment stores the at least one alternative mode in association with the power-using mode. Note that, explanations about the same functions as the load-side storage device 23 of Embodiment 1 are omitted.

The alternative mode is defined as a mode which is smaller in the maximum power consumption and is longer in the performing time than the associated power-using mode. The power-using property 922 of the alternative mode is defined as a property defining a time variation of a power consumption from the time of start of performing the alternative mode, as shown in FIG. 12. The maximum power consumption of the power-using property 922 is 1200 W, and is smaller than 1500 W of the maximum power consumption of the power-using property 921. Further, the performing time of the power-using property 922 is about 34 minutes, and is longer than about 26 minutes of the performing time of the power-using property 921.

Figures 13, 14:
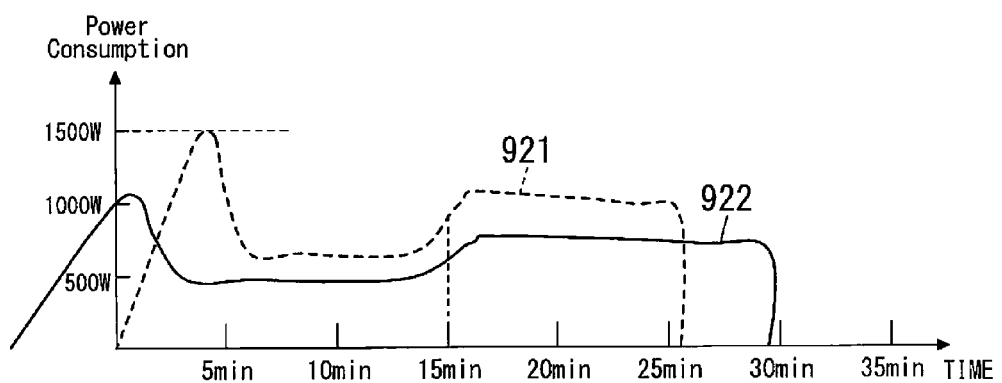
FIG. 13 is a diagram illustrating the correspondence table of the power-using modes and the alternative modes of the large power-using power load in accordance with Embodiment 5.
FIG. 14 is a diagram illustrating the power-using properties of the power-using mode and the alternative mode of the large power-using power load in accordance with Embodiment 5.

The load-side storage device 23 of the present embodiment stores a correspondence table 913 as shown in FIG. 13. In the correspondence table 913, some of the power-using modes are associated with the alternative modes. In the example of FIG. 13, the second mode is associated with the second alternative mode, and the K-th mode is associated with the K-th alternative mode. In contrast, the first mode and the N-th mode are not associated with alternative modes.

When determining that the power-using mode is not performable, the load-side processor 25 of the large power load 2 of the present embodiment performs the alternative mode associated with this power-using mode. Note that, explanations about the same functions as the load-side processor 25 of Embodiment 1 are omitted.

Further, when the total power decreases as a result of the operation of the power load 6 while the power-using mode is performed, the load-side processor 25 of the present embodiment switches to the alternative mode associated with the power-using mode.

For example, as shown in FIG. 14, when the total power becomes smaller than the maximum power consumption after a lapse of 15 minutes from the time of start of performing the power-using mode, the power-using mode corresponding to the power-using property 921 is switched to the alternative mode corresponding to the power-using property 922. In this case, switching to the alternative mode is done when the power-using mode is performed, and therefore the alternative mode is not performed from the beginning but is performed from the intermediate point. In this regard, the power-using property 922 is not performed from a point of time after a lapse of 15 minutes from the beginning of the power-using property 922, but is performed from a point of time the power-using property 922 corresponding to a point of time of the power-using property 921 of the power-using mode after a lapse of 15 minutes or more from the beginning of the power-using property 921. In short, the alternative mode is performed from at a point of time of the power-using property 922 after a lapse of 20 minutes from the beginning of the power-using property 922.

As with the power management system of the present embodiment described above, it is preferable that the multiple power-using modes include a specific power-using mode and the load-side storage device 23 be configured to store an alternative mode in association with the specific power-using mode. The alternative mode has a power-using property which is smaller in a maximum power consumption and is longer in performing time than the power-using property of the specific power-using mode. In this case, the operation controller (the load-side processor 25) is configured to, when the specific power-using mode is determined by the determination unit (the load-side processor 25) not to be performable, perform the alternative mode associated with the specific power-using mode. In this regard, the operation controller is configured to perform the alternative mode associated with the power-using mode so that a maximum power consumption of the large power-using power load is smaller than the remaining available power.

In the power management system of the present embodiment, the large power-using power load 2 performs the alternative mode, and thereby the current maximum power consumption becomes smaller than the maximum power consumption of the power-using mode, but the current performing time becomes longer than the performing time of the power-using mode. As a result, it is possible to perform a mode desired by a user. In a case of cooking rice, the original power-using mode requires 30 minutes for cooking rice. However, in the alternative mode, cooking rice can be done in 40 minutes while the maximum power consumption (maximum heating power) is reduced. In another case where the large power-using power load 2 is a storage battery, when the storage battery has a slow charging mode as the alternative mode for the normal charging mode, it is possible to charge the storage battery while the charging time is increased and the maximum power consumption is decreased.

Further, as with the power management system of the present embodiment, it is preferable that the operation controller (the load-side processor 25) is configured to, when total power becomes smaller than the maximum power consumption of the specific power-using mode while the specific power-using mode is performed, switch to the alternative mode associated with the specific power-using mode. The total power is defined as a sum of the remaining available power and a power consumption of the power-using unit 21. In this case, the operation controller switches to the alternative mode associated with the specific power-using mode so that the maximum power consumption of the large power-using power load is smaller than the total power.

Even if the total power decreases while the large power-using power load 2 is in operation, the power management system of the present embodiment can continue the operation desired by a user by switching to the alternative mode.

Note that, the power management system of any one of Embodiments 2 to 4 may be configured such that the large power-using power load 2 has the at least one alternative mode as with the present embodiment.

In the descriptions of Embodiments 1 to 5 relate to the allowable power selected so that a circuit breaker interrupts a current flow when the total power consumption exceeds the allowable power. As modifications of Embodiments 1 to 5, the allowable power may be selected so that an electric rate increases when the total power consumption exceeds the allowable power. For example, the total power consumption is measured on a monthly basis, and the largest one of the total power consumptions for one year is used for calculation of the electric rate of the electric company. In this example, when the maximum of the total power consumption exceeds the contract power, the electric rate increases. To prevent an increase in the electric rate, the allowable power may be set equal to the contract power. Consequently, it makes possible to operate the large power load 2 so that the total power consumption does not exceed the contract power.

The present invention is described with reference to preferable embodiments. Such embodiments can be subjected to changes and modifications by the skilled person unless such changes and modifications do not depart from the original spirit and scope of the present invention, that is, the scope of the claimed subject-matter.

The invention claimed is:

1. A power management system comprising:
   a power management device including a processor and configured to manage power to be used by multiple power loads; and
   a large power-using power load which is one of the multiple power loads,
   the large power-using power load being defined as a power load which shows a power consumption larger than a difference between allowable power regarding a total power consumption of the multiple power loads and an upper limit power regarding the total power consumption which is smaller than the allowable power when operating at a maximum power consumption,
   the processor including:
      a setting unit configured to set the upper limit power;
      an acquiring unit configured to acquire the total power consumption given by a measurement value from a measurement unit configured to measure the total power consumption;
      a calculating unit configured to calculate remaining available power which is available for the large power-using power load, from the upper limit power set by the setting unit and the total power consumption acquired by the acquiring unit; and a notification unit configured to notify the remaining available power calculated by the calculating unit, to the large power-using power load, and the large power-using power load including:
 a power-using load configured to perform a predetermined operation by using power; and
 an operation controller configured to allow the power-using load to start to operate under a condition that a power consumption of the power-using load is equal to or less than the remaining available power notified by the power management device.

2. The power management system according to claim 1, wherein the operation controller is configured to, after allowing the power-using load to start to operate, allow the power-using load to keep operating under a condition that the power consumption of the power-using load is equal to or less than total power which is a sum of the remaining available power notified by the power management device and a power consumption of the power-using load at a time of notification of the remaining available power notified by the power management device.

3. The power management system according to claim 1, wherein the calculating unit of the power management device is configured to use a value obtained by subtracting the total power consumption from the upper limit power, as the remaining available power.

4. The power management system according to claim 1, wherein the calculating unit of the power management device is configured to use a value obtained by subtracting the total power consumption and a constant value from the upper limit power, as the remaining available power.

5. The power management system according to claim 3, wherein the calculating unit of the power management device is configured to calculate the remaining available power when the total power consumption exceeds the upper limit power as a result of use of power by one or some of the multiple power loads other than the large power-using power load while the large power-using power load is in operation.

6. The power management system according to claim 1, wherein:
 the large power-using power load further includes a load-side processor configured to send a notification request of the remaining available power to the power management device; and
 the calculating unit of the power management device is configured to calculate the remaining available power in response to reception of the notification request from the large power-using power load.

7. The power management system according to claim 1, wherein the notification unit of the power management device is configured to notify the remaining available power to the large power-using power load in push delivery.

8. The power management system according to claim 1, configured to stop power supply to the multiple power loads when the total power consumption exceeds the value of the allowable power.

9. A power management device to be used in the power management system according to claim 1.

10. A large power-using power load to be used in the power management system according to claim 1.

11. The power management system according to claim 2, wherein the calculating unit of the power management device is configured to use a value obtained by subtracting the total power consumption from the upper limit power, as the remaining available power.

12. The power management system according to claim 2, wherein the calculating unit of the power management device is configured to use a value obtained by subtracting the total power consumption and a constant value from the upper limit power, as the remaining available power.

13. The power management system according to claim 4, wherein the calculating unit of the power management device is configured to calculate the remaining available power when the total power consumption exceeds the upper limit power as a result of use of power by one or some of the multiple power loads other than the large power-using power load while the large power-using power load is in operation.

14. The power management system according to claim 2, wherein:
 the large power-using power load further includes a load-side processor configured to send a notification request of the remaining available power to the power management device; and
 the calculating unit of the power management device is configured to calculate the remaining available power in response to reception of the notification request from the large power-using power load.

15. The power management system according to claim 3, wherein:
 the large power-using power load further includes a load-side processor configured to send a notification request of the remaining available power to the power management device; and
 the calculating unit of the power management device is configured to calculate the remaining available power in response to reception of the notification request from the large power-using power load.

16. The power management system according to claim 1, wherein the allowable power is selected so that a circuit breaker interrupts a current flow when the total power consumption exceeds the allowable power, or so that an electric rate increases when the total power consumption exceeds the allowable power.

17. A power management system for managing power to be used by multiple power loads,
 the multiple power loads including a large power-using power load,
 the large power-using power load being defined as a power load which shows a power consumption larger than a difference between allowable power regarding a total power consumption of the multiple power loads and an upper limit power regarding the total power consumption which is smaller than the allowable power when operating at a maximum power consumption,
 the power management system comprising a processor which includes:
 a setting unit configured to set the upper limit power;
 an acquiring unit configured to acquire the total power consumption;
 a calculating unit configured to calculate remaining available power which is available for the large power-using power load, from the upper limit power set by the setting unit and the total power consumption acquired by the acquiring unit; and
 an operation controller configured to allow the large power-using power load to start to operate under a condition that a power consumption of the large power-using power load is equal to or less than the remaining available power.

18. The power management system according to claim 17, wherein the allowable power is selected so that a circuit breaker interrupts a current flow when the total power consumption exceeds the allowable power, or so that an electric rate increases when the total power consumption exceeds the allowable power.

19. A power management method for managing power to be used by multiple power loads, the multiple power loads including a large power-using power load, the large power-using power load being defined as a power load which shows a power consumption larger than a difference between allowable power regarding a total power consumption of the multiple power loads and an upper limit power regarding the total power consumption which is smaller than the allowable power when operating at a maximum power consumption, the power management method comprising:
setting the upper limit power;
acquiring the total power consumption;
calculating remaining available power which is available for the large power-using power load, from the upper limit power and the total power consumption; and
allowing the large power-using power load to start to operate under a condition that a power consumption of the large power-using power load is equal to or less than the remaining available power.

20. The power management method according to claim 19, wherein the allowable power is selected so that a circuit breaker interrupts a current flow when the total power consumption exceeds the allowable power, or so that an electric rate increases when the total power consumption exceeds the allowable power.

\* \* \* \* \*